3,486,925
FLEXIBLE, FIBROUS, POROUS SHEET CONTAINING CURED EPOXY RESIN AND PROCESS OF MAKING SAME
Jerome J. Hoffman, Hastings, Minn., assignor to Minnesota Mining and Manufacturing Company, St. Paul, Minn., a corporation of Delaware
No Drawing. Continuation-in-part of application Ser. No. 542,765, Apr. 15, 1966. This application Dec. 12, 1966, Ser. No. 600,789
Int. Cl. B44d 1/14, 1/02; C08c 17/16
U.S. Cl. 117—76    19 Claims

ABSTRACT OF THE DISCLOSURE

Process for treating flexible sheet with (1) a water insoluble polyether polyamine having a molecular weight of at least 1000 and having oxytetramethylene recurring units as the major portion of the polyether moiety and oxyalkylene or thioalkylene as the minor portion thereof, said polyether having less than about 3 weight percent of secondary amino nitrogen atoms and less than about 0.3 weight percent of tertiary amino nitrogen atoms and (2) an epoxy resin having an oxirane equivalence greater than 1 and an oxirane/active hydrogen equivalence ratio of at least 1.5, and (3) an epoxy curing catalyst, with or without fillers such as leather fiber, and curing at room temperature or higher. Also a flexible product coated, impregnated and/or finished with such compositions.

---

This application is a continuation-in-part of U.S. application Ser. No. 542,765, filed Apr. 15, 1966, now abandoned.

This invention relates to treating leather and other porous substrates. In one aspect this invention relates to novel compositions for coating or impregnating leather products and leather substitutes. In still another aspect this invention relates to finished leather products and techniques for their preparation.

Finishes and impregnants are frequently applied to tanned animal hides used in shoe uppers, furniture upholstery, handbags, wallets, belts, luggage, articles of apparel, etc. not only to improve their appearance but also to improve their properties. Such finishes are employed primarily as binders to unify the leather fibers and improve their resiliency abrasion resistance and resistance to penetration by soil and liquids. In the early leather finishing art a variety of natural products such as animal glue casein and albumen were employed as the bonding or finishing materials. With the availability of synthetic polymers other more useful finishing materials were developed. Elastomeric acrylate polymers and polyurethanes have found particularly wide acceptance because of their ease of application and their relative effectiveness in imparting some degree of resilience, abrasion resistance and resistance to water and common organic solvents. They also possess a relatively high elongation in film form, a property which is essential for the shaping of shoe uppers during the lasting operation.

Despite their many excellent properties acrylate polymers and polyurethanes still have certain disadvantages. Films formed from acrylate polymers tend to be susceptible to abrasion marking or scuffing. Although the polyurethanes excel in scuff resistance, they are applied in a reactive state and are incompatible with water, thus requiring the use of special solvents which are costly and frequently toxic and/or flammable. Moreover, the moisture content of leather must be carefully controlled within narrow limits to insure satisfactory bonding of the reactive polyurethane during the subsequent curing steps. The necessity of curing the polyurethane further complicates the process, since the curing rate and the extent of cure must be controlled. Ambient temperature and conditions of humidity affect these curing properties. High temperature and high humidity do accelerate the rate and the extent of cure, and on occasions a cured finish may be produced which is hard and brittle and susceptible to cracking or checking either during the shoe manufacture or later during the wearing of the finished shoe.

Split leather and other leathers having undesirable surface characteristics may be improved by impregnation and/or by coating to provide a synthetic epidermal layer. The problems of adhesion, appearance, moisture vapor transmission, flex strength, etc. have made it difficult to achieve the desired results and provide a commercially acceptable product. Similar problems have been encountered in the manufacturer of a leather substitute from a suitable synthetic substrate mat or web.

It is an object of this invention to provide an improved composition for treating leather containing matrices and other non-woven porous webs, sheets or batts.

Still another object of this invention is to provide a finish which can be applied to leather or sheets as a 100% resin mixture, as an aqueous emulsion or as a solution in organic solvent.

A further object of this invention is to provide a polymeric finishing system for leather which is compatible with dyes, pigments, lubricants, fillers, waxes, polymers, polishes, and slip agents which may be used in the treatment of leather.

Yet another object of this invention is to provide a polymeric layer or coating on leather which is highly resistant to water and solvent penetration and to abrasion and scratching.

Another object of this invention is to provide a polymeric layer or coating for leather or leather containing matrices which, in cured film form, has elastomeric properties, good adhesion to leather, and a relatively high moisture vapor permeability or "breathability."

A further object of this invention is to provide a leather finish which enhances the "break" (i.e. the appearance of creased leather) and which has outstanding durability to prolonged, repeated flexure.

Still another object of this invention is to provide a synthetic epidermal layer or coating on a leather containing substrate.

Other objects and advantages of this invention will be apparent from the following disclosure.

It has been found that the above and other advantages may be realized by treating a flexible, natural or synthetic, fibrous, porous sheet (including non-woven webs, fabrics, etc. but preferably being a sheet containing leather fibers) with a composition comprising (1) a water insoluble polyether polyprimary amine having a molecular weight of at least 1000, preferably from 1000 to about 20,000 and usually in the 5000–15,000 range, and having a primary amino terminal group attached directly to each end of a polyether moiety containing recurring groups of which at least a major portion consists of oxytetramethylene recurring units and at most a minor portion consists of oxyalkylene or thioalkylene recurring units having from 2 to 6 straight chain carbon atoms, at least half of said primary amino terminal groups having the structure —$OC_4H_8NH_2$, said polyether moiety having less than about 3 percent by weight of secondary amino nitrogen atoms and less than about 0.3 percent by weight of teritary amino nitrogen atoms, and (2) an epoxy resin having an oxirane equivalence (i.e. number of oxirane groups per molecule) greater than one, preferably from 1.5 to 4, the oxirane/active hydrogen equivalence ratio being between 1/1 and 20/1. The oxirane/active hydrogen equivalence ratio is obtained by dividing the number of oxirane equivalents present in the total epoxy resin by the number of amine-attached active hydrogen equivalents present in the total weight of the amine. The composition may also containe various dissolved or dispersed polymers (e.g. acrylate polymers, polyurethanes, etc.), dyes, pigments, fillers, waxes, slip agents, natural or synthetic fibers (e.g. leather fibers), lubricants and other materials of value in leather finishes.

The ratio of polyamine and epoxy resin has a significant effect on the quality of the final sheet. When the polyether polyprimary amine is in the lower molecular weight range it is usually desirable to use an oxirane/active hydrogen equivalence ratio of from 1/1 to 2/1 in order to provide a material which, after curing, has an ultimate elongation of at least about 50 percent in film form. When the polyether polyprimary amine has a molecular weight in the higher ranges, e.g. 10,000, the oxirane/active hydrogen equivalence ratio of from 1/1 to 20/1 can be employed to advantage. If the epoxy resin has a high aromatic content, e.g. the diglycidyl ether of bisphenol A, it is preferable to use a somewhat lower oxirane/active hydrogen equivalence ratio than in the case of essentially aliphatic epoxy resins, e.g. the diglycidyl ether of 1,4-butanediol. When an oxirane/active hydrogen equivalence ratio of 1/1 is employed, the amine-oxirane reaction can be accelerated by the incorporation of a neutral salt type catalyst, e.g. lithium bromide, into the finish composition. Without such a catalyst the complete curing reaction may require about two weeks at 70° F., but the sheet may undergo normal processing during this extended curing without serious complications. The curing may also be accelerated at elevated temperature, although normally prolonged heating of natural leather is to be avoided.

When a stoichiometric excess of epoxy resin is employed it is usually necessary to use a catalyst which is capable of converting the epoxy resin per se into its hardened thermoset form. Such catalysts are well known in the epoxy resin curing art. One particularly useful catalyst class is the class of tertiary amines, e.g. 2,4,6-tris (dimethylaminomethyl) phenol; tributylamine; N-methyl piperidine, etc. Polyalkylene polyamines, polycarboxylic acids and anhydrides, polythiols and salts may also be used as catalysts. An outstanding catalyst, generally used in the range of 1 to 10 weight percent based on total resins weight, is 2,4,6-tris(dimethylaminomethyl) phenol.

The polyether polyprimary amines of this invention have an exceptionally high degree of primary amino terminal functionality and are essentially free of terminal hydroxyl groups. In fact, their high degree of primary amino terminal functionality can be characterized by their ability to react with a standard epoxy formulation to produce a cured product having good ultimate tensile strength and ultimate elongation values. Specifically, these polyether polyprimary amines produce cured products having at least 50 percent ultimate elongation and at least 200 pounds per square inch ultimate tensile strength when mixed with a stoichiometric amount of the diglycidyl ether of 2,2-bis(parahydroxy phenyl) propane (oxirane equivalent weight of 190–200) in the presence of two percent, based on total solids weight, of thiobis (disecondary amyl phenol) and heated for four hours at 120° C. A sheet formed from this material is then tested for ultimate elongation and ultimate tensile by the procedures set forth in ASTM D–412–62T, using die C for specimen preparation and a rate of extension of 10 inches per minute at a test temperature of 23° C. Polyether polyprimary amines of molecular weight above 3500 must provide cured products having at least 400 percent ultimate elongation and at least 500 p.s.i. ultimate tensile strength when used in the above test procedure. These polyether polyprimary amines may be prepared by reacting tetrahydrofuran and up to about 40 mol percent of another cationically polymerizable cyclic ether or cyclic thioether in the presence of trifluoromethanesulfonic anhydride at temperatures from about —40° C. to +80° C. in a polymerization system which is relatively free of monoalkylatable chain terminating agents. Suitable cationically polymerizable cyclic ethers (including cyclic thioethers) include oxacycloheptane; 3,3-bis-(chloromethyl) oxacyclobutane; phenyl glycidyl ether; propylene oxide; ethylene sulfide, epichlorohydrin; 2-methyl tetrahydrofuran; all of the foregoing having from 2 to 6 ring carbon atoms per molecule. The polyether polyprimary amines may be prepared by reacting tetrahydrofuran alone or together with up to 40 mol percent of a suitable cationically polymerizable cyclic ether comonomer in the presence of trifluoromethane-sulfonic anhydride at temperatures from about —40° C. to +80° C. in a polymerization system which is relatively free of monoalkylatable chain terminating agents to produce a polyether having a high degree of cationic activity at the ends of the polyether chain. The molecular weight of the dicationically active polyether varies in an inverse manner with the concentration of trifluoromethane-sulfonic anhydride, and a 1/20 to 1/400 molar ratio of trifluoromethanesulfonic anhydride to cyclic ether monomer is normally desired to prepare polyethers having from 1000 to about 20,000 molecular weight in a conversion of about 50%. The polycationically active polyether is a strong alkylating agent and can be reacted with ammonia to add primary amino radicals to the cationically active sites. From stoichiometric to excess amounts of ammonia are preferred in this reaction, and a temperature from about —100° C. to about +60° C. is generally suitable, although the lower temperatures (below about 25° C.) are normally preferred to moderate the rate of reaction. Solvents which are inert to alkylation, such as methylene chloride, trichloromethane and cyclohexane, may be used. Depending on the concentration ratio of ammonia to the polycationically active polyether, the polyamine product can contain secondary or tertiary amone groups internally situated in the essentially linear polyether moiety, since the terminal primary amino radical can be further alkylated by another cationically active polyether molecule. The presence of tertiary amino nitrogen atoms in the polymer chain can provide some branched chains with recurring units similar to those in the main polymer chain, but the molecule may still be considered to be essentially linear. For the preparation of a polyether diprimary amine a large excess of ammonia, generally at least a five-fold excess, is preferred.

Exceptionally wide latitude is afforded in the selection of the conditions which are used in carrying out the reaction of polyether polyprimary amines with epoxy resins. Principal variables to be considered in such vulcanization reactions are:

(1) The specific epoxy resin chosen,
(2) The manner of addition of the polyether polyprimary amine to the epoxy resin,
(3) The use of catalysts or co-curatives with these reactants, and (4) The ratios of these reactants.

Any of a large number of epoxy resins can be used in such vulcanization reactions. These may include monoepoxides in addition to polyepoxides. If a mixture of epoxy resins is employed, it is important that the oxirane equivalence be greater than 1, preferably at least 1.5. The choice of an aliphatic epoxy resin generally serves to produce a final vulcanizate which has outstanding ultimate elongation. The use of epoxy resins having a high content of aromatic or condensed ring structures generally gives a final vulcanizate which is superior in load bearing properties but somewhat lower in ultimate elongation. The polyepoxide resins which are particularly useful in preparing the vulcanizates of this invention are well known and need not be set forth in detail. Monoepoxide resins which may be employed to advantage, particularly when mixes of lower viscosity are desired, include butyl glycidyl ether, phenyl glycidyl ether, allyl gycidy ether and the gycidyl ether of m-pentadecenylphenol. A particularly preferred class of polyepoxide resins is derived from the reaction of epichlorohydrin with bisphenol A. This class may be represented by the formula:

about 2200 centipoises. Normally the adduct resins have a long and useful shelf-life, particularly when stored as a 50% solution in an inert solvent, such as toluene. Such adduct resins undergo less than about a 50% increase in viscosity at room temperature over a period of about 6 months. The viscosity of the adduct resin solution is preferably less than about 20,000 centipoises at the time it is utilized.

These adduct or "B-stage" resins find use in various leather coating or finishing compositions and are ultimately converted to a cured, or "C-stage," state. The B-stage procedure is often a preferred method for obtaining elastomeric cured coatings, since the adduct is normally still soluble in conventional inert solvents and can be subsequently cured by the addition of catalyst alone, with or without the application of heat.

Irrespective of whether "A" or "B" stage resins are employed, wide latitude exists in the choice of the curing reaction conditions chosen. With respect to catalysts, it is possible to employ a tertiary amine, a Lewis acid complex (e.g. boron trifluoride diethyl etherate), or a wide variety of organo-metallic compounds to accelerate the

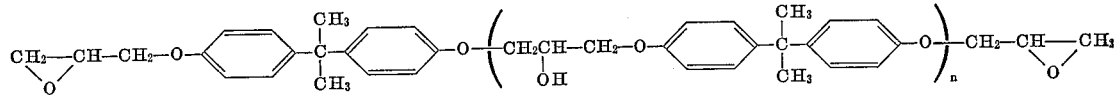

In this formula $n$ may have a value of between 0 and about 10. The structure of this diepoxide resin class may be described by reference to either its melting point or, more usually, to its oxirane equivalent weight. Thus, when $n$ has a value of 0 the resin has an oxirane equivalent weight of 170 and when $n$ has a value of 10 the resin has an oxirane equivalent weight of 1590. The polyepoxide resin employed for the purposes of this invention is usually a mixture of compounds and will generally have an oxirane equivalent weight ranging from 170 to 1600, but lower and higher equivalent weight epoxy resins may be employed to advantage on occasions.

There are two methods of reacting the resins of this invention with epoxy resins which generally are employed. The first involves simply the mixing of the polyether polyprimary amine with the epoxy resin, either with or without solvents, and the direct conversion to a vulcanized elastomeric state. This process is commonly referred to as an "A-stage" procedure. An alternative method of producing these vulcanizates involves a prereaction of the polyether polyprimary amine with the epoxy resin to form an adduct which is still soluble and processable. This process is normally referred to as a "B-stage" procedure. Adducts of this type may conveniently be prepared by the reaction of these polyether polyprimary amines and an epoxy resin in a 50 percent solution of the mixed resins in toluene or other suitable solvent at a reflux temperature for a period of about 2 to 8 hours. In the B-stage reaction it is normally desirable to employ an oxirane/active hydrogen equivalence ratio of at least 1.5/1 to 1/1, preferably at least 2.5/1. The viscosity and the shelf-life of the adduct solution are largely dependent upon the molecular weight of the starting polyether polyprimary amine and the equivalence ratio of oxirane to amine-attached active hydrogen. At the lower oxirane/active hydrogen equivalence ratio, e.g. 1.5:1 to 4:1, considerable viscosity increase occurs during the reaction. An initial viscosity of 1500 centipoises at room temperature is typical of a 50% toluene solution in which a 10,000 molecular weight polyether diprimary amine is used at the beginning of the reaction. After 4 hours of reflux the viscosity increases to about 5000 centipoises if the oxirane/active hydrogen equivalence ratio is 3:1 and the epoxy resin used is the diglycidyl ether of 2,2-bis(para-hydroxy phenyl) propane. If a 7:1 equivalence ratio for the same resin mix is used, the viscosity increases only to cure. A particularly useful vulcanization method involves the use of between about 0.5 and 10 parts by weight of 2,4,6-tris-(N,N,-dimethyl aminomethyl)phenol as the curing catalyst based on 100 parts of resin. When this catalyst is used, cure conditions normally vary from approximately one day at 25° C. to 2 minutes at 150° C. using about 3 parts by weight of catalyst per 100 parts of adduct. The catalyst is mixed into the resin formulation immediately prior to its application onto the leather fiber containing surface. The physical properties of the cured coating will vary with the molecular weight of the starting polyether polyamine and also with the oxirane/active hydrogen equivalence ratio used. In some instances it may be advantageous to include a co-curative, e.g. an additional polyprimary amine or an organic polyanhydride, in the reaction mixture. Thus, metaphenylene diamine or diethylene triamine may be employed along with the polyether diprimary amines of this invention, the amount of epoxy resin used being increased sufficiently to insure an oxirane/active hydrogen equivalence of about 1/1 in an A-stage formulation and at least 1.5/1, preferably at least 2.5/1 in B-stage formulations. Various other fillers and additives usefully employed in the curing of epoxy resins may also be included.

When the initial polyether polyprimary amine has a molecular weight of about 1000, an oxirane/active hydrogen equivalence ratio of 1 normally produces, upon curing, a product having an ultimate elongation of at least 50 percent.

When the initial polyether polyprimary amine has a molecular weight of about 3500, an oxirane/active hydrogen equivalence ratio of between 1/1 and 5/1 normally produces, upon curing, an elastomeric product (Shore $A_2$ hardness below 95). When the polyether polyprimary amine has a molecular weight of about 5000, an oxirane/active hydrogen equivalence ratio of between 1/1 and 8/1 normally will produce an elastomeric cured product. When the polyether polyprimary amine has a molecular weight of about 10,000, an oxirane/active hydrogen equivalence ratio of between 1/1 and 12/1 generally produces an elastomeric cured product.

When the initial polyether polyprimary amine has a molecular weight of about 20,000, an oxirane/active hydrogen equivalence ratio of 3/1 to 20/1 generally is desired to produce an elastomeric cured product. At oxirane/active hydrogen ratios significantly higher than 20/1 the final cured products are generally hard enough to be classified as rigid plastics (Shore $A_2$ hardness value of at least 95), and they are useful primarily on leather which is not subject to flexing. It has been found that, for a given molecular weight of the polyether polyprimary amine, values for the oxirane/active hydrogen equivalence ratio significantly above the upper preferred value produces a cured product with ultimate elongation values generally too low to be suitable for treating leather which will be subjected to considerable flexing during use.

Leather, particularly that which is intended for use in shoe uppers, is normally subjected to multiple finishing operations in which several coatings are deposited upon the substrate. Finishers may frequently apply as many as five separate coatings to the leather to achieve the desired effects. Although it is possible, and frequently desirable, to use the compositions of this invention as the sole binder for each of these coatings, it is particularly desirable to use the compositions of this invention as the base coat or impregnation coat for the leather. In general, it is desirable to impregnate leather or other porous matrices either from emulsion or solution containing from about 5 to about 40% by weight of the combined polymers, with or without other additives useful in leather finishing, controlling the viscosity for optimum results. The compositions of this invention are applied in amounts from about 1 gram to about 10 grams of total resin per square foot of leather, when the treatment is applied as an impregnation coating. Subsequent to impregnating, finishing coats may be employed in the range of about 0.2 to 5 grams per square foot of leather. As indicated earlier, other ingredients may be incorporated into the impregnating or finishing compositions. The combined polymers of the present invention, and their cured products, adhere extremely well to leather (an important characteristic for impregnating or coating) and confer exceptional resistance to abrasion, scratching and scuffing of the leather in addition to imparting improved "break" to leather suitable for shoe lasting, when applied as a top or finishing coating to leather. If the treating compositions of this invention are utilized as impregnation coatings, subsequent top or finishing coats may be applied either prior to or subsequent to the curing of the polymers applied during impregnation. For example, natural leather may be given an impregnation coating from a solution containing 20% by weight of a polyether polyprimary amine having an equivalent weight of 10,000 and an epoxy resin having an equivalent weight of about 200, the oxirane/active hydrogen equivalence ratio being about 3/1, and an acrylic emulsion may be immediately deposited upon the impregnated leather before the impregnant solvent is removed, i.e. before the impregnation coating is dried.

The above considerations are also pertinent to the preparation of synthetic epidermal layers or coatings on split leather, i.e. leather having the natural epidermal layer removed, or on cloth or synthetic fibrous substrates. Such synthetic epidermal layers may involve coating weights as much as 10 grams of total resin per square foot and even higher, depending on the surface characteristics of the substrate (e.g. roughness) and the desired appearance of the epidermal layer (e.g. smoothness, etc.). Because of the excellent adhesion of the cured polymer compositions of this invention to leather, natural leather or leather fiber containing synthetic substrates are preferred. The inclusion of leather fibers (e.g. leather dust) in such epidermal coatings is particularly preferred, improving the moisture vapor transmission and the ability of such layers to be buffed smooth prior to the application of conventional leather finishes. If desired, before the coatings of this invention are fully cured, fiber flock may be applied to the uncured, tacky surface, thereby providing a unique suede like finish.

The treating compositions of this invention may be applied by any of the known techniques for treating leather or other collagen-derived fiber containing matrices, including swabbing, transfer coating, knife coating, roll coating, reverse roll coating, flow coating, curtain coating or spraying operations. Synthetic epidermal coatings may also be prepared by knife coating, extrusion coating, etc. As indicated earlier, the polyamine and epoxy resins may be mixed immediately before application to the porous matrix with a suitable catalyst and applied directly to the substrate. Alternatively, a preformed adduct prepared from the epoxy resin and polyether polyamine may be prepared as a solution or emulsion, and a suitable catalyst may be added just prior to its application onto the matrix. In general, the polymeric constituents and catalysts are preferably selected to give a curing cycle which varies from about 6 hours to about fourteen days at room temperature to develop the fully cured elastomeric product. Elevated temperatures up to about 200° F. may also be employed to accelerate the cure which, in some instances, is attained with 10 minutes. Sheet material treated with the finishing compositions of this invention may be subjected to buffing and plating operations at any time after the surface tackiness disappears.

Unlike leathers treated with reactive polyurethane materials containing free isocyanate groups, the cured products obtained from the compositions of this invention are characterized by their insensitivity to the moisture content of the leather and the humidity of the environment in which curing is performed. Another important advantage is the ability of these polymers to cure to a predetermined stable elastomeric state beyond which no further cross-linking occurs. On the other hand, it is difficult to control the rate and extent of cure with polyurethane treatments, due to their water sensitivity. Furthermore, reactive polyurethanes tend to further cure upon extended aging, occasionally resulting in a brittle film which tends to crack or check during shoe lasting operations or during the wearing of the finished shoe. A further desirable characteristic of the polyether polyamine-epoxy resin treating compositions of this invention is their good shelf-life as a stable emulsion, an advantage not achieved with reactive polyurethanes. It has been found that the treating systems of this invention impart an exceptional degree of abrasion resistance to leather and leather fiber containing matrices when applied as a base or impregnation coat, which property is believed to be related to the elastomeric characteristic of the cured film and its outstanding adherence to the leather or collagen-derived fibers. This abrasion resistance appears to be significantly greater than that achieved with acrylic resins. Another valuable property of the cured products of this invention is their relatively high moisture vapor transmission properties, a very important attribute in finishes for shoe uppers which contributes significantly to comfort, e.g. foot comfort during wear. The cured products of this invention, when used as a synthetic epidermal layer on low grade leather substrate, such as split leather, provide a product with good physical properties (e.g. moisture vapor transmission, flex durability, etc.) and appearance.

One of the disadvantages of utilizing polyurethane finishes or coatings for leather and other porous matrices is the extreme difficulty, and frequent impossibility, of applying subsequent coatings if the previously applied polyurethane reaches an advanced state of cure. This appears to be related to the fact that present conventional leather finishes do not develop adequate adhesion to the cured polyurethane surface. However, since the combined polymers of the present invention and their cured product adhere very well to cured polyurethane surfaces, particularly when slightly elevated temperatures are used to effect the cure, they may be used to treat leather or other similarly microporous matrices which contain a cured or partially cured polyurethane resin on their surface or as an interior constituent thereof, permitting the finishing of certain sheets which otherwise might be considered extremely difficult, if not impossible, to finish and also permitting the preparation of epidermal coatings on leather fiber containing substrates.

EXAMPLE 1

2100 ml. of tetrahydrofuran was distilled from LiAlH$_4$ into a 3-liter flask equipped with stirrer and drying tube. The temperature was reduced to −70° C., and 210 ml. of (CF$_3$SO$_2$)$_2$O was added. The reactants were rapidly warmed to −10° C. and held at this temperature for 7.5 minutes. The resulting polymer solution was cooled to about −23° C. Polymerization was then terminated by pouring the reactants into a mixture of 1485 ml. of liquid ammonia and 1485 ml. of tetrahydrofuran maintained initially at −70° C. Excess ammonia was then removed, and the polymer was freed of catalyst residues by treatment with a strongly basic ion exchange resin. After removal of volatile materials under vacuum, 600 grams of low melting poly(tetramethylene oxide) diprimary amine was obtained (molecular weight by analysis of amine end groups is about 1400).

A 10 weight percent solids solution in toluene of 36.5 grams of the above poly(tetramethylene oxide) diprimary amine (0.1 active hydrogen equivalent), 19.2 grams of the diglycidyl ether of bis-phenol A (molecular weight 384, 0.1 oxirane equivalent) and 1.92 grams of 2,4,6-tris(dimethylaminomethyl) phenol was swabbed onto the grain surface of buffed, tanned cowhide side leather to deposit 2.2 grams of solid per square foot. This was dried in the oven for 30 minutes at about 150° F. and then was allowed to remain at room temperature for two weeks prior to testing. The abrasion resistance of this impregnated leather was excellent as judged by the resistance to marking upon rubbing the surface vigorously with the serrated edge of a newly minted U.S. twenty-five cent coin. The moisture vapor transmission was 32.4 grams/square meter/hour at 72° F. and 50% relative humidity, a value sufficiently high to insure comfort to the wearer if this material were employed as a shoe upper. The untreated leather control sample had a moisture vapor transmission of 33.4 grams/square meter/hour.

EXAMPLE 2

3.6 pounds of freshly distilled trifluoromethanesulfonic anhydride catalyst was added to 176 pounds of tetrahydrofuran in a 25 gallon, glass-lined kettle under 10 p.i.s.g. nitrogen pressure. The mixture was stirred for 30 minutes during which time the temperature increased from 15° to 46° C. At this point the contents of the kettle were transferred rapidly through a tube of polyethylene into a stirred solution of 7.2 pounds of ammonia in 92.8 pounds of toluene kept at 12° C. in a 50 gallon stainless steel reactor. After 30 minutes the excess ammonia, tetrahydrofuran and toluene were stripped from the product. Toluene was added to produce a 30% solution which was treated with a strongly basic anion exchange resin to remove all traces of catalyst residues. The polyether diprimary amine product was then dried and characterized. The amine equivalent weight was 4050, the inherent viscosity in benzene at 25° C. was 0.39, and the bulk viscosity was 48,700 centipoises at 65° C.

A solution of 100 grams of this poly(tetramethylene oxide) diprimary amine and 48 grams of the diglycidyl ether of bis-phenol A (384 molecular weight) in 150 grams of toluene, representing a 5/1 oxidane/active hydrogen equivalence ratio, was prepared and kept at 72° F. for 24 hours, resulting in a partially reacted or "B" stage adduct. This solution was then diluted to 30% solids by the addition of toluene, and 4.8 grams of 2,4,6-tris(dimethylaminomethyl) phenol was added. A portion of this solution was applied to brushed, tanned pigskin leather by swabbing, and the impregnated leather was heated at 150° F. for 30 minutes. The remaining solution was diluted to 10% solids by addition of toluene, and this was used to apply a second coating onto the leather sample by swabbing. After the sample was heated for one hour at 150° F., buffed and cold pressed at 500 p.s.i. pressure for one minute, the same solution was used to apply a third coating, after which the leather was processed in the same manner as used following the second coating. Two light coats of a commercial acrylic polymeric emulsion were applied to the pigskin, and the sample was pressed at 150° F. and 250 p.s.i. pressure for 15 seconds. A total of 8 grams of coating was applied per square foot of leather.

The finished leather was very glossy and supple, had excellent "break" characteristics and was extremely abrasion resistant. Dynamic water penetration testing, using the procedures of ASTM D–2099–62T, resulted in no penetration after 22,000 flex cycles, the point at which the test was discontinued. The leather was also tested for finish adhesion and integrity using flex testing procedures approved by American Leather Chemists Association and American Society for Testing Materials for testing finishes on upholstery leather with a Newark flex tester (ASTM D–2097–62T). The finish remained unaffected through 400,000 flex cycles.

EXAMPLE 3

The following were charged into a 25 gallon glass-lined kettle maintained under a positive pressure of nitrogen:

| | Parts by wt. |
|---|---|
| Cyclohexane | 25 |
| Tetrahydrofuran | 144 |
| Pyrosulfuryl fluoride catalyst | 1.84 |

The contents were stirred at 30° C. for 5 hours and then transferred to a 50 gallon, stainless steel kettle containing 8 parts of anhydrous ammonia dissolved in 92 parts of tetrahydrofuran. After the mixture was stirred for two hours, the excess ammonia and tetrahydrofuran were vacuum stripped from the polymeric product. Toluene was added to a 30 percent solution of the product, and this solution was slurried with 100 parts of a strongly basic anion exchange resin to remove all catalyst residue. The material was then filtered and dried by vacuum stripping to produce 72 parts of poly(tetramethylene oxide) diprimary amine having a 0.51 inherent viscosity in benzene at 25° C. and an amine equivalent weight of 5,400.

A 50 weight percent xylene solution containing 100 grams of the above poly(tetramethylene oxide) diprimary amine and 36.4 grams of diglycidyl ether of bis-phenol A (384 molecular weight, 5/1 oxirane/active hydrogen equivalence ratio) was prepared and kept at room temperature for 18 hours to form a partially reacted, "B" stage adduct. The solution was then diluted to 15 percent solids with xylene containing a dissolved black dye, 2.13 grams of 2,4,6-tris(dimethylaminomethyl) phenol was added, and the resulting solution was used to coat samples of tanned and buffed kip leather, tanned and brushed pigskin, an unfinished synthetic leather comprising a microporous polyurethane sheet laminated to a nonwoven polyester fiber web (available under the trade name "Corfam" from E. I. du Pont de Nemours and Co.), and an unfinished synthetic leather comprising a microporous, water laid structure in which particles of an elastomeric polyurethane were distributed throughout a matrix of nylon and natural leather fibers. The two synthetic leather samples were treated only once with this impregnant solution and were then immediately heated for 30 minutes at 150° F. They were tested after one week of conditioning at 72° F. and 50 percent relative humidity. The kip and pigskin samples were swabbed immediately after impregnation with the above solution with a 15 percent solids water emulsion of a conventional, leather finishing acrylic polymer before the impregnant coating had dried. These samples were heated for 15 minutes at 150° F. and allowed to condition at room temperature for 24 hours. Two additional coatings of the same acrylic polymer emulsion were applied, using the same procedures, and a nitrocellulose lacquer was finally sprayed onto the finished surface. The test results are provided in Table I.

The above mixture was coated onto a water laid sheet made from a cross-linked polyether polyurethane latex

TABLE I

| Substrate | Impregnant Solids Deposited (gm./ft.²) | Appearance | Abrasion Resistance (coin test) | Moisture Vapor Transmission (gm./ meter ²/hr.) | Flex Durability |
|---|---|---|---|---|---|
| Kip (cowhide) | 4.9 | Very smooth, excellent break. | Excellent | 15 | 144,000,* no cracking. |
| Pigskin | 5.2 | ___do___ | ___do___ | 13 | 144,000,* slight crack. |
| Corfam | 2.0 | ___do___ | ___do___ | 20 | 144,000,* no cracking. |
| Water-laid artificial leather | 3.5 | ___do___ | ___do___ | 15 | 144,000,* slight crack. |

*Number of flex cycles on the Bally Flexometer, a machine used to evaluate the effectiveness of finishes for shoe upper leathers and manufactured by Bally Schuh Fabriken-A.G., Schonenwerd, Switzerland.

Substantially similar results are obtained when the mixed resins of this invention are applied to leather from aqueous emulsions. Suitable emulsions may be made in a variety of ways. Thus, the polyether diamine and epoxy resins may be codissolved in an inert, water immiscible solvent to give about a 50 percent solution and this solution may then be emulsified in water using a high shear mixer and any surface active materials or protective colloids capable of giving oil-in-water emulsions. When made in this fashion, however, the resins tend to cure slowly on storage and become less effective in time. Much more satisfactory results are obtained when the resins (or solutions of the resins) are emulsified separately and then either combined or stored separately until application to leather. If a curing catalyst is desired, it is normally added to the combined emulsions just before application. However, it is possible and sometimes desirable to add the curing catalyst to the polyether diprimary amine resins before or during the emulsification process. When the catalyst is incorporated in this fashion, the polyether diamine and epoxy resin emulsions should not be combined until they are to be applied to leather.

It is usually desirable to employ an inert organic solvent, such as benzene or toluene, as a diluent for the resins to facilitate the emulsification. When the presence of the solvent is considered objectionable, it may be removed by stripping from the emulsion at any time after its manufacture.

The preferred flexible substrates treated in accordance with this invention are "leather-like," resembling natural leather or leather substitutes having the attributes of natural leather. For shoe upper materials one of the desired properties of the treated substrates of this invention is microporosity sufficient to permit moisture vapor transmission comparable to that of natural leather, i.e. at least 10 grams/square meter/hour with a caliper thickness of 50 mils measured between chambers respectively at 100% and 50% relative humidity and at a temperature of 25° C.

EXAMPLE 4

A coating composition suitable for use on leather, split leather, or various synthetic leather substrates was made by mixing together 800 grams of poly(tetramethylene oxide) diprimary amine having a molecular weight of 12,500 and a bulk viscosity of 250,000 cps. at 150° F., 171 grams of the diglycidyl ether of bisphenol A having an epoxy equivalent of 192, 342 grams of the glycidyl ether of meta-pentadecenyl phenol and 1967 grams of xylene. This solution was stirred overnight to insure homogeneity and at this time had a viscosity of 870 cps. at 25° C.

To 200 grams of this 40% solution in a one liter breaker, 24 grams of leather dust and 3 grams of 2,4,6-tris(dimethylaminomethyl) phenol were added and the mixture was stirred with a three-bladed impeller driven by an air motor until all the leather dust had been well dispersed.

[prepared from toluene diisocyanate, polypropylene glycol of 1500 molecular weight and sufficient triol (425 molecular weight) from propylene oxide and trimethylol propane to provide a cross-linked density of 1 cross-link per 10,000 polymer molecular weight], leather fibers and nylon fibers (¼ inch average length, 1.5 denier) in a solids weight ratio of 6:2:1, respectively, useing a knife coated with a 20 mil opening. After air drying for 18 hours the coating was cured in an oven at 150° F. for 5 hours. The resulting coating had a continuous, black, matte appearance. It had a moisture vapor transmission (MVT) of 15.0 grams per square meter per hour and flexed 191,000 times on the Bally flexer before failure.

Other coating solutions were made up using the same solution of diamine and epoxy resins by mixing in the same proportion of other pigments and fillers. These were run through a colloid mill (Morehouse Model A-200) with the clearance set at 4 mils and were then coated onto the same water laid sheet used above. The results are summarized in the following table.

| Pigment or Filler | Bally flex to produce failure | MVT, g./sq.m./hr. |
|---|---|---|
| Wood flour | 93,000 | 16.5 |
| Corn cob dust | 190,000 | 20.4 |
| Carbon black | 93,000 | 7.5 |
| Cork 90 mesh | 191,000 | 18.0 |
| Iron oxide | 191,000 | 6.0 |

The leather dust used in this and subsequent examples was obtained by buffing the grain side of chrome-tanned cowhide. It had a water content of 9% and a fat liquor content of 5%. All leather dust was passed through a 20 mesh screen before use.

EXAMPLE 5

A coating solution suitable for use on leather or cloth was made by dissolving 1000 parts of poly(tetramethylene oxide) diprimary amine having a molecular weight of 9500 and a bulk viscosity of 95,000 cps. at 150° F., 243 parts of the diglycidyl ether of bis-phenol A, and 343 parts of the glycidyl ether of metapentadecenyl phenol in 2380 parts of a xylene mixture. The solution was mixed overnight to insure homogeneity. A film cast from this solution, after curing at room temperature for four days, had a tensile strength of 4380 p.s.i. and an elongation at break of 526%.

To 200 grams of this reaction mixture in a one liter breaker was added 26.7 grams of leather dust and 3 grams of tris(dimethylaminomethyl) phenol using a three-bladed impeller to get a uniform dispersion. The resulting viscous mixture was coated onto the water laid sheet of Example 4 and onto a medium weight chrome tanned cowhide split with a knife coater using a 20 mil opening. After air drying, curing was effected by heating the coated sheets in an oven at 150° F. for 5 hours. The coating had a black, smooth, matte appearance.

| | Bally flex | MVT |
|---|---|---|
| Water laid sheet | 114,000 | 15.3 |
| Cowhide split | 500,000 | 26.3 |

EXAMPLE 6

Leather dust was treated with enough sulfonated neat's-foot oil in water to raise the fat liquor content of the leather dust to 20% by weight. After thorough mixing the slurry was evaporated to dryness. This leather dust was mixed into the epoxy-diamine solution as in Example 5 to give a viscous coating solution which was applied to a cowhide split, to a corrected grain cowhide, and to a cotton twill cloth (72×48 thread count). These coatings were dried and cured as above. Bally flex results and MVT data are given in the table below:

| | Bally flex | MVT |
|---|---|---|
| Cloth | 285,000 | 12.8 |
| Cowhide split | 500,000 | 22.6 |
| Corrected grain cowhide | 500,000 | 10.7 |

EXAMPLE 7

150 grams of poly(tetramethylene oxide) diprimary amine having a molecular weight of 9500 was mixed with 36.3 grams of the diglycidyl ether of bis-phenol A, and 54 grams of the glycidyl ether of meta-pentadecenyl phenol to obtain a very viscous mixture. This reaction mixture was heated to 150° F. and was then coated onto a split cowhide using a knife coater and a 7 mil opening. After standing overnight the coating was cured at 150° F. for 3 hours. The resulting material had an MVT of 12 grams/sq.m./hr. and a Bally flex of 425,000 before failure.

The same reaction mixture coated on corrected grain cowhide and cured in the same way produced a smooth patent leather like finish. The product has an MVT of 6 grams/sq.m./hr. and a Bally flex of 500,000 without failure.

EXAMPLE 8

A solution was made by mixing together 450 grams of poly(tetramethylene oxide) diprimary amine having a molecular weight of 9800, 107 grams of diglycidyl ether of bis-phenol A, 26.2 grams each of petroleum jelly and lanolin and 1823 grams of xylene. After mixing for one day 500 grams of this reaction mixture was placed in a one liter beaker equipped with a mixer, and 42 grams of leather dust and 3 grams of 2,4,6-tris(dimethylaminomethyl) phenol were added. After becoming well dispersed the reaction mixture was further mixed by running it through a colloid mill with a setting of less than 1 millimeter. It was then coated onto (a) water laid sheet made from polyurethane latex, leather fibers, and nylon fibers (same as Example 4), (b) a carded web of 70% nylon and 30% polypropylene fibers impregnated with a nonionic elastomeric polyether polyurethane (Latex E-207, Wyandotte Chemical Company), (c) a piece of cotton twill cloth, and (d) corrected grain cowhide. After drying overnight the coatings were cured by placing in an oven at 150° F. for 5 hours. The Bally flex and moisture vapor transmission of the coated products are given in the following table.

| | Bally flex | MVT |
|---|---|---|
| Water laid sheet | >853,000 | 7.3 |
| Impregnated carded web | >853,000 | 4.2 |
| Cotton twill cloth | >760,000 | 7.1 |
| Corrected grain cowhide | >853,000 | 16.3 |

In some cases water laid substrates of the above type were used which had poor flex durability, e.g. a Bally flex of 10,000. After application of the coating of this example the flex durability of the water laid sheet was improved by a factor of ten or more. In similar experiments when the setting on the colloid mill was 3 millimeters or greater, the coated products had higher MVT values.

Various other embodiments of the present invention will be apparent to those skilled in the art without departing from the scope thereof.

The embodiments of the invention in which an exclusive property or privilege is claimed are defined as follows:

1. A flexible, fibrous, porous sheet containing a cured reaction product of (1) a water insoluble polyether polyprimary amine having a molecular weight of at least 1000 and having a primary amino terminal group attached directly to each end of a polyether moiety containing recurring groups of which at least a major portion consists of oxytetramethylene recurring units and at most a minor portion consists of oxyalkylene or thioalkylene recurring units having from 2 to 6 straight chain carbon atoms, at least one-half of said primary amino terminal groups having the structure —OC$_4$H$_8$NH$_2$, said polyether moiety having less than about 3 percent by weight of secondary amino nitrogen atoms and less than about 0.3 percent by weight of tertiary amino nitrogen atoms and (2) an epoxy resin having an oxirane equivalence greater than 1, the oxirane/active hydrogen equivalence ratio being between 1/1 and 20/1.

2. The sheet of claim 1 in which said polyether polyprimary amine has a molecular weight between about 1000 to about 20,000.

3. The sheet of claim 1 in which said epoxy resin has an oxirane equivalence from about 1.5 to 4.

4. The sheet of claim 1 in which said sheet contains leather fibers.

5. The sheet of claim 1 in which said sheet is natural leather.

6. The sheet of claim 1 in which said sheet is a nonwoven leather substitute.

7. The sheet of claim 1 in which said cured product is contained in the internal structure of said sheet.

8. The sheet of claim 1 in which said cured product is contained as a finish coating on the surface of said sheet.

9. The sheet of claim 8 in which said coating also contains leather dust dispersed therein.

10. The sheet of claim 1 in which said cured product is contained as a synthetic epidermal coating on the surface of said sheet.

11. The sheet of claim 1 having a plurality of superposed coatings thereon, at least the coating in contact with said sheet containing said cured product.

12. A process for finishing a flexible, fibrous, porous sheet which comprises applying thereto (1) a water insoluble polyether polyprimary amine having a molecular weight of at least 1000 and having a primary amino terminal group attached directly to each end of a polyether moiety containing recurring groups of which at least a major portion consists of oxytetramethylene recurring units and at most a minor portion consists of oxyalkylene or thioalkylene recurring units having from 2 to 6 straight chain carbon atoms, at least one-half of said primary amino terminal groups having the structure

—OC$_4$H$_8$NH$_2$ said polyether moiety having less than about 3 percent by weight of secondary amino nitrogen atoms and less than about 0.3 percent by weight of tertiary amino nitrogen atoms (2) an epoxy resin having an oxirane equivalence greater than 1, the oxirane/active hydrogen equivalence ratio being between 1/1 and 20/1 and (3) an epoxy curing catalyst, and curing the components thereon.

13. A process for treating a flexible, fibrous, porous sheet which comprises reacting in an inert organic solvent (1) a water insoluble polyether polyprimary amine having a molecular weight of at least 1000 and having a primary amino terminal group attached directly to each end of a polyether moiety containing recurring groups of which at least a major portion consists of oxytetramethylene recurring units and at most a minor portion consists of oxyalkylene or thioalkylene recurring units having from 2 to 6 straight chain carbon atoms, at least one-half of said primary amino terminal groups having the structure —$OC_4H_8NH_2$, said polyether moiety having less than about 3 percent by weight of secondary amino nitrogen atoms and less than about 0.3 percent by weight of tertiary amino nitrogen atoms with (2) an epoxy resin having an oxirane equivalence greater than 1, the oxirane/active hydrogen equivalence ratio being at least 1.5, to form a soluble adduct having available oxirane groups, adding an epoxy curing catalyst thereto, applying the resultant admixture to said sheet, and completely curing said adduct in situ.

14. The process of claim 13 in which said adduct is impregnated into said sheet and completely cured therein.

15. The process of claim 13 in which said adduct is completely cured as a surface coating on said sheet.

16. The process of claim 13 in which said sheet contains a polyurethane impregnant.

17. The process of claim 13 in which said sheet contains a polyurethane surface coating.

18. The process of claim 13 in which said sheet contains leather fibers.

19. The process of claim 13 in which said admixture applied to said sheet also contains leather fibers.

References Cited

UNITED STATES PATENTS

| | | |
|---|---|---|
| 2,585,115 | 2/1952 | Greenlee. |
| 2,880,116 | 3/1959 | Alps et al. _____ 117—142 X |
| 3,004,952 | 10/1961 | Brueschweiler et al. |
| 3,245,827 | 4/1966 | Weber _____ 117—141 X |
| 3,298,856 | 1/1967 | Harding _____ 117—142 X |

WILLIAM D. MARTIN, Primary Examiner

R. HUSACK, Assistant Examiner

U.S. Cl. X.R.

117—83, 135.5, 140, 141, 142, 161, 164; 260—47